(12) United States Patent
Byun et al.

(10) Patent No.: US 11,089,601 B2
(45) Date of Patent: Aug. 10, 2021

(54) METHOD AND DEVICE FOR PERFORMING INTERFERENCE COORDINATION PER SLICE

(71) Applicant: LG ELECTRONICS INC., Seoul (KR)

(72) Inventors: Daewook Byun, Seoul (KR); Jian Xu, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 16/491,142

(22) PCT Filed: Mar. 5, 2018

(86) PCT No.: PCT/KR2018/002584
§ 371 (c)(1),
(2) Date: Sep. 4, 2019

(87) PCT Pub. No.: WO2018/164431
PCT Pub. Date: Sep. 13, 2018

(65) Prior Publication Data
US 2019/0394783 A1 Dec. 26, 2019

Related U.S. Application Data

(60) Provisional application No. 62/467,210, filed on Mar. 5, 2017, provisional application No. 62/471,374, filed (Continued)

(51) Int. Cl.
*H04B 7/00* (2006.01)
*H04W 72/08* (2009.01)
(Continued)

(52) U.S. Cl.
CPC ..... *H04W 72/082* (2013.01); *H04W 72/0446* (2013.01); *H04W 76/15* (2018.02); *H04W 92/20* (2013.01)

(58) Field of Classification Search
CPC ............. H04W 72/04; H04W 72/0406; H04W 72/0426; H04W 72/082
(Continued)

(56) References Cited

U.S. PATENT DOCUMENTS 9,078,255 B2 * 7/2015 Pang ................. H04W 72/0426
10,264,461 B2 * 4/2019 Aijaz ..................... H04W 16/10
(Continued)

FOREIGN PATENT DOCUMENTS

| CN | 103825694 | 5/2014 |
|---|---|---|
| CN | 105227258 | 1/2016 |

(Continued)

OTHER PUBLICATIONS

PCT International Application No. PCT/KR2018/002584, International Search Report dated Jun. 5, 2018, 4 pages.
(Continued)

*Primary Examiner* — Dmitry Levitan
(74) *Attorney, Agent, or Firm* — Lee Hong Degerman Kang Waimey

(57) ABSTRACT

Provided are a method for a base station performing interference coordination in a wireless communication system, and a device supporting same. The method may comprise the steps of: receiving slice IDs from a neighboring base station; receiving interference coordination information per slice from the neighboring base station; and performing interference coordination per slice on the basis of the interference coordination information corresponding to the slice IDs.

11 Claims, 16 Drawing Sheets

Related U.S. Application Data on Mar. 15, 2017, provisional application No. 62/472,594, filed on Mar. 17, 2017.

(51) Int. Cl.
*H04W 76/15* (2018.01)
*H04W 72/04* (2009.01)
*H04W 92/20* (2009.01)

(58) Field of Classification Search
USPC ................................ 370/310, 329, 437, 465
See application file for complete search history.

(56) References Cited

U.S. PATENT DOCUMENTS

| | | | |
|---|---|---|---|
| 10,638,405 B2 * | 4/2020 | Myhre | H04W 74/0833 |
| 2013/0044704 A1 | 2/2013 | Pang et al. | |
| 2016/0218841 A1 | 7/2016 | Centonza et al. | |
| 2018/0049015 A1 * | 2/2018 | Gupta | H04W 8/005 |
| 2019/0159027 A1 * | 5/2019 | Kuge | H04W 60/00 |
| 2019/0174498 A1 * | 6/2019 | Samdanis | H04W 16/10 |
| 2019/0182733 A1 * | 6/2019 | Shimojou | H04W 36/0055 |
| 2019/0320436 A1 * | 10/2019 | Han | H04W 72/10 |
| 2019/0394783 A1 * | 12/2019 | Byun | H04W 72/0446 |

FOREIGN PATENT DOCUMENTS

| | | |
|---|---|---|
| CN | 108259151 | 7/2018 |
| EP | 1931073 | 9/2010 |
| EP | 2823679 | 1/2015 |
| EP | 3554124 | 10/2019 |
| KR | 20130008468 | 1/2013 |
| KR | 20160003560 | 1/2016 |
| WO | 2013/133661 | 9/2013 |

OTHER PUBLICATIONS

Zhilan Xiong, et al., Dynamic ICIC in LTE-Advanced Networks for Inter-Cell Interference Mitigation, In: Vehicular Technology Conference (VTC Fall), 2015 IEEE 82nd, Sep. 2015, 7 pages.
European Patent Office Application Serial No. 18764212.9, Search Report dated Feb. 5, 2020, 9 pages.
3rd Generation Partnership Project (3GPP), "Technical Specification Group Radio Access Network; Study on New Radio Access Technology; Radio Access Architecture and Interfaces (Release 14)," 3GPP TR 38.801 V1.2.0, R3-170744, Feb. 2017, 90 pages.
The State Intellectual Property Office of the People's Republic of China Application Serial No. 201880021393.0, Office Action dated Oct. 10, 2020, 7 pages.

* cited by examiner

METHOD AND DEVICE FOR PERFORMING INTERFERENCE COORDINATION PER SLICE

CROSS-REFERENCE TO RELATED APPLICATIONS

This application is the National Stage filing under 35 U.S.C. 371 of International Application No. PCT/KR2018/002584, filed on Mar. 5, 2018, which claims the benefit of U.S. Provisional Application Nos. 62/467,210, filed on Mar. 5, 2017, 62/471,374, filed on Mar. 15, 2017, and 62/472,594, filed on Mar. 17, 2017, the contents of which are all hereby incorporated by reference herein in their entireties.

BACKGROUND OF THE INVENTION

Field of the Invention

The present invention relates to a wireless communication system, and more particularly, to a method in which a base station performs interference coordination per slice, and a device supporting the method.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

SUMMARY OF THE INVENTION

Meanwhile, according to the conventional technique, interference coordination between cells or interference coordination between base stations (BSs) has been considered on a physical resource block (PRB) basis or a subframe basis. However, in 5G NR, since a new RAN node provides a service to a user equipment (UE) on the basis of a slice, the use of the existing interference coordination method may cause various problems (e.g., providing of incorrect almost blank subframe (ABS) information). Accordingly, there is a need to propose an interference coordination method considering a slice and a device supporting the method.

In an embodiment, there is provided a method in which a BS performs interference coordination in a wireless communication system. The method may include: receiving a slice identifier (ID) from a neighboring BS; receiving interference coordination information per slice from the neighboring BS; and performing interference coordination per slice on the basis of the interference coordination information corresponding to the slice ID.

In another embodiment, there is provided a BS for performing interference coordination in a wireless communication system. The BS may include: a memory; a transceiver' and a processor coupling the memory and the transceiver. The processor may be configured to control the transceiver to receive a slice ID from a neighboring BS, control the transceiver to receive interference coordination information per slice from the neighboring BS, and perform interference coordination per slice on the basis of the interference coordination information corresponding to the slice ID.

Interference coordination can be performed on a slice basis.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
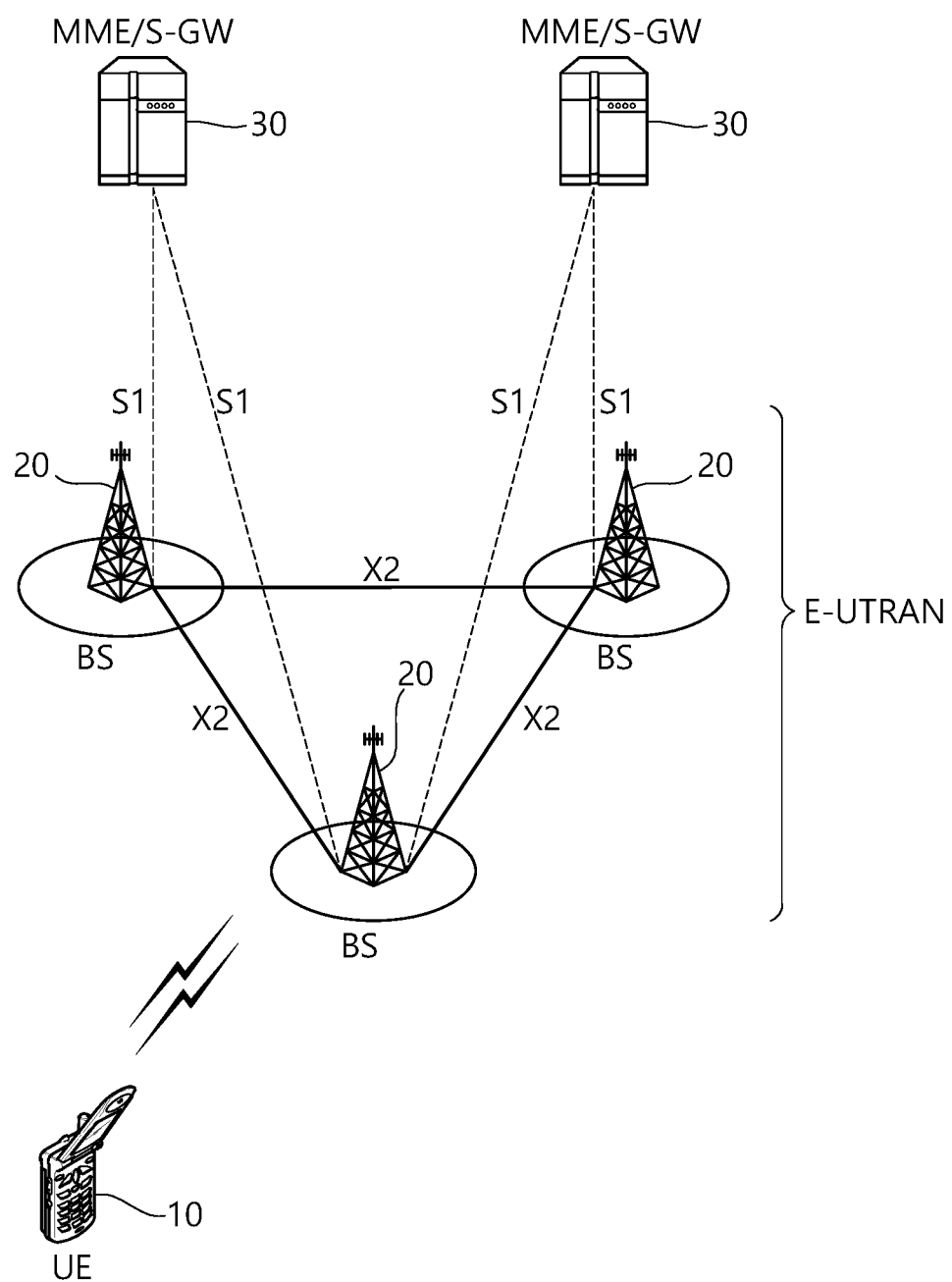
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBS 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBS 20 are interconnected by means of an X2 interface. Neighboring eNBs may have a meshed network structure that has the X2 interface. The eNBS 20 are connected to the EPC by means of an S1 interface. The eNBS 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
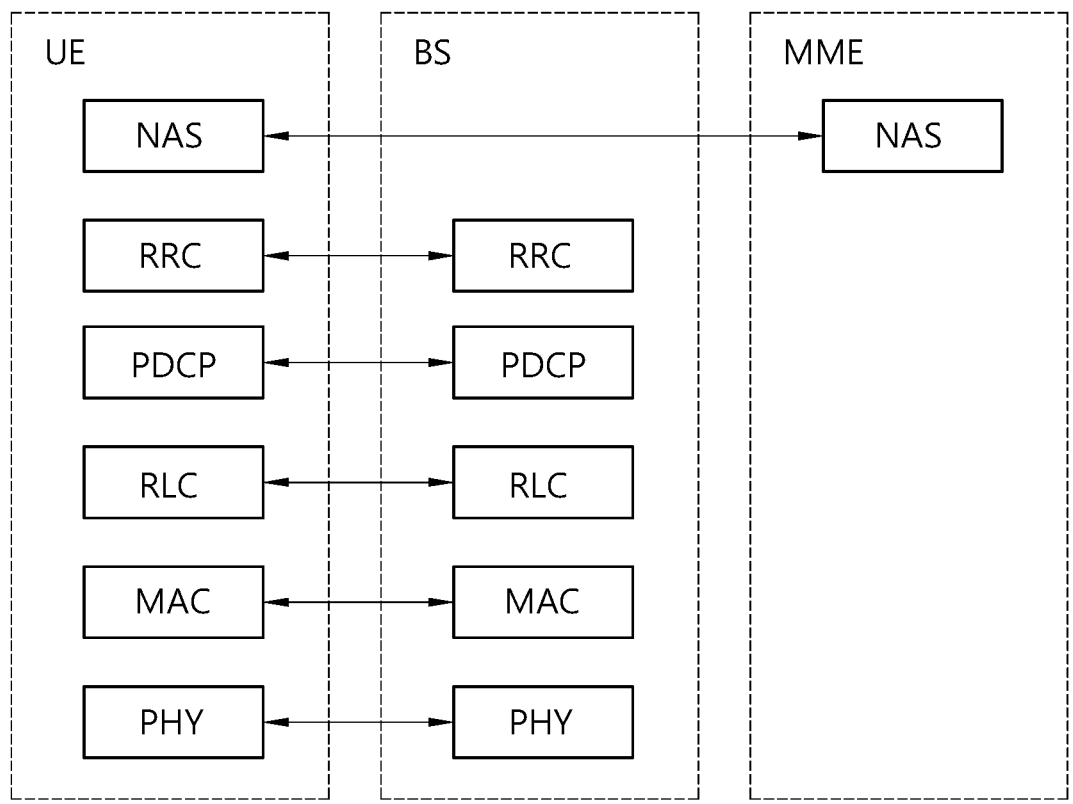
FIG. 2 shows a control plane of a radio interface protocol of an LTE system.
Figure 3:
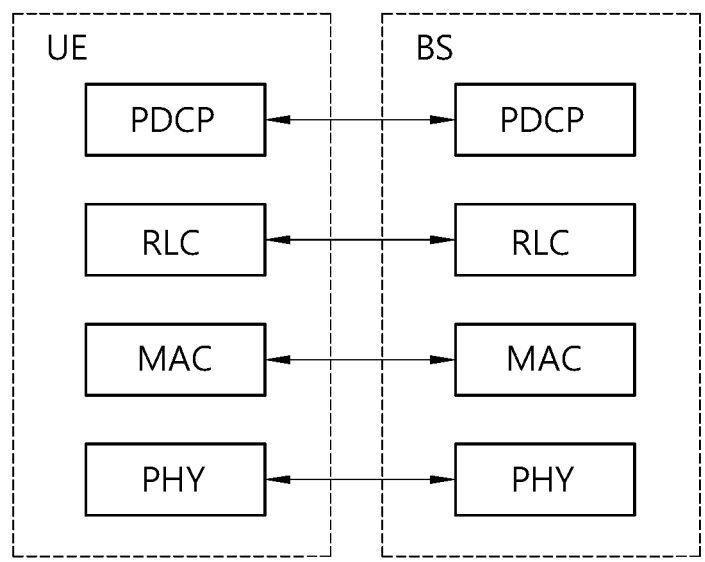
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, a 5G network structure is described.

Figure 4:
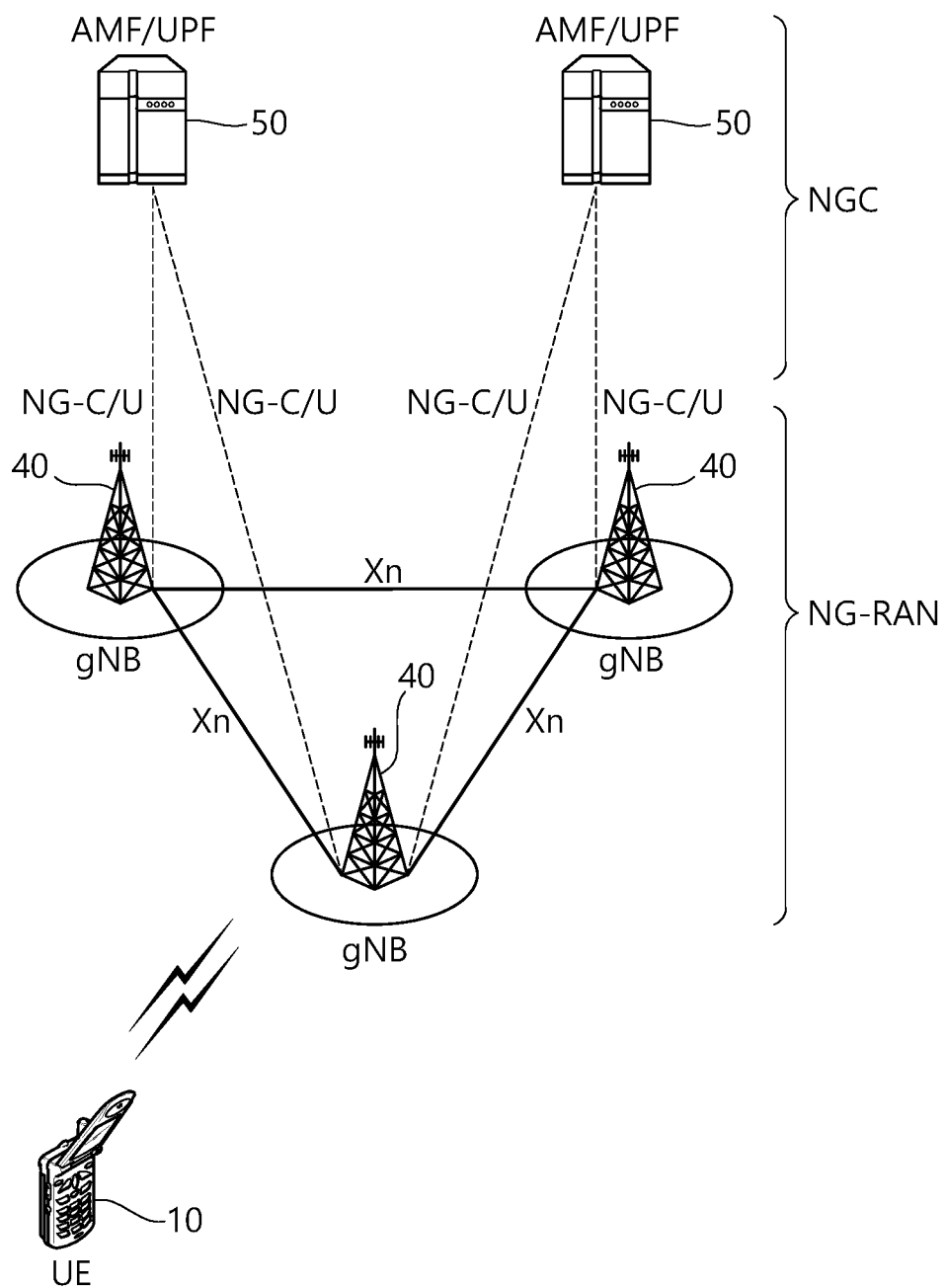
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Figure 5:
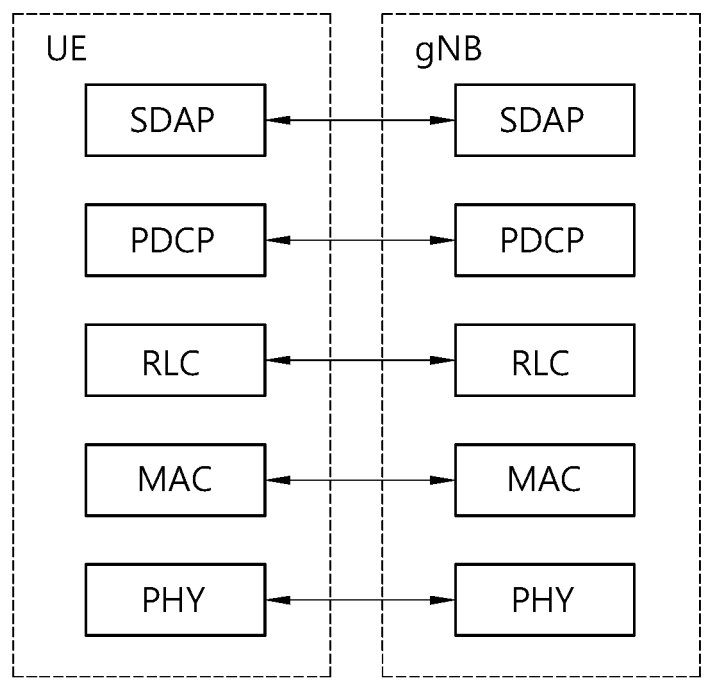
FIG. 5 shows a radio interface protocol of a 5G system for a user plane.

FIG. 5 shows a radio interface protocol of a 5G system for a user plane.

Referring to FIG. 5, in comparison with the LTE system, a radio interface protocol of a 5G system for a user plane may include a new layer, which is referred to as a Service Data Adaptation Protocol (SDAP). The main services and functions of the SDAP layer correspond to mapping between a Quality of Service (QoS) flow and a data radio bearer (DRB) and QoS flow ID (QFI) marking in both DL and UL packets. A single protocol entity of the SDAP may be configured (or setup) for each separate PDU session excluding dual connectivity in which two entities may be configured.

Hereinafter, network slicing will be described.

Flexibility and adaptability for a service and a network function are differentiated primary features of a 5G system. Network slicing is one of primary concept for achieving the flexibility. According to the network slicing, various requirements for a network can be efficiently supported.

The network slicing means to provide various services of different features by separating one physical network into a plurality of logical networks configured with a specific network function. In this case, isolation between different network slices may be required so that a service provided by one network slice does not have effect on a service provided by the different network slice.

In general, a service for a user may be provided by one network slice operated by a network operator. However, a specific user may have access to one or more network slices simultaneously to use a service of more various features such as a mobile broad band (MBB), critical communication, or the like. When the specific user intends to have access to one or more network slices simultaneously, the network operator shall prevent any signaling procedure from being performed redundantly.

Figure 6:
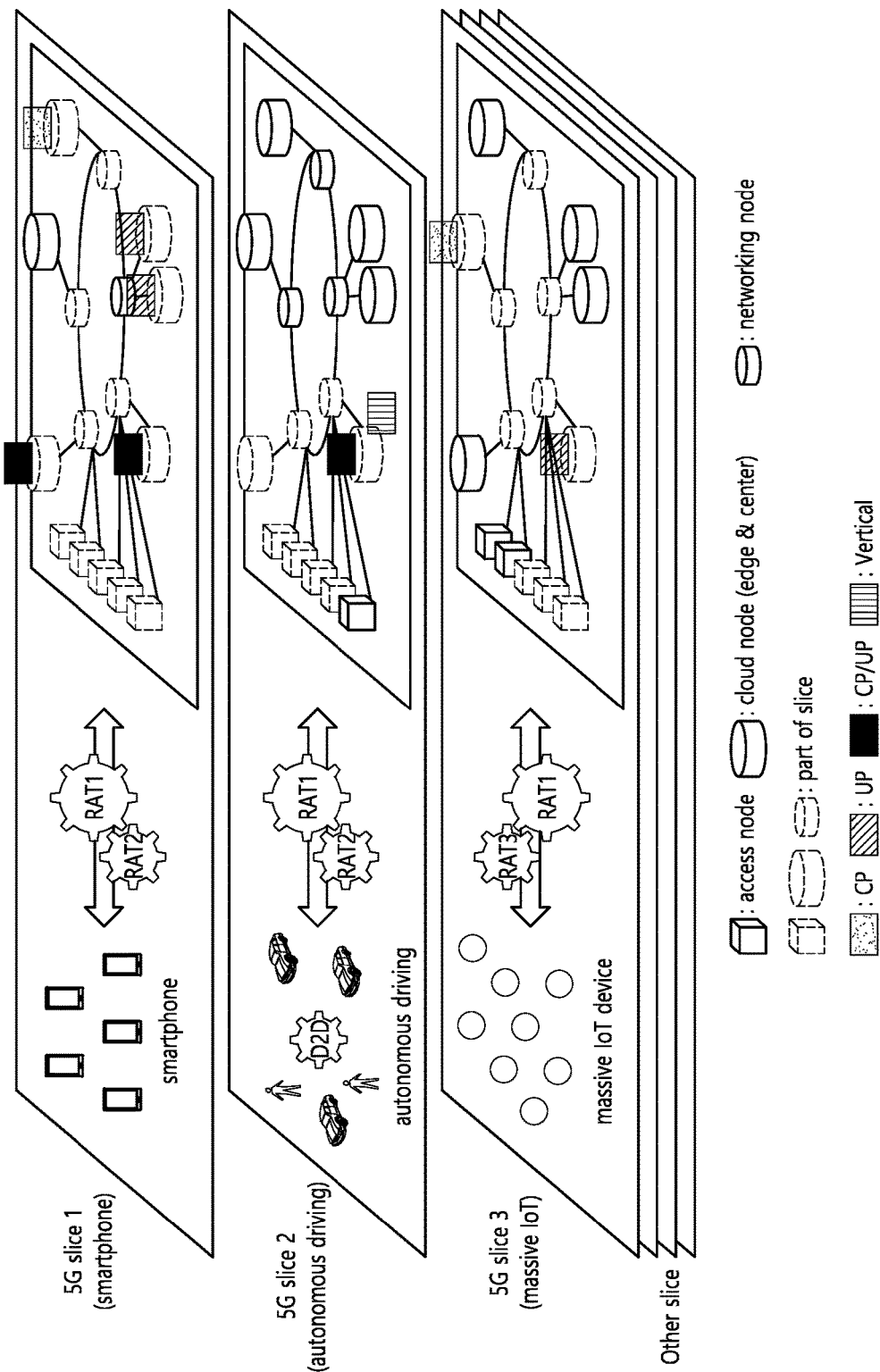
FIG. 6 shows an example of network slicing.

FIG. 6 shows an example of network slicing.

Referring to FIG. 6, one physical network may be sliced into a logical network such as a slice 1 for supporting a smartphone, a slice 2 for supporting autonomous driving, a slice 3 for supporting massive IoT, and an extra slice for supporting an extra service. Accordingly, for example, the slice 2 may be selected when the network is requested to provide an autonomous driving service.

A resource (e.g., a resource in a virtualized server and a virtualized network resource) is guaranteed for each slice. In addition, since the slices are isolated from each other, even if an error or failure occurs in a specific slice, it does not have effect on communication of different slices. For example, even if a failure occurs in the slice 1 for supporting the smartphone, since the failure occurring in the slice 1 does not have effect on different slices, the autonomous driving service and the massive IoT may be normally performed.

Meanwhile, according to the conventional technique, interference coordination between cells or interference coordination between BSs has been considered on a physical resource block (PRB) basis or a subframe basis. However, in 5G NR, since a new RAN node provides a service to a UE on the basis of a slice, the use of the existing interference coordination method may cause various problems. For example, a new RAN node A may request a neighboring new RAN node B to provide an almost blank subframe (ABS) for a specific slice. Since the existing interference coordination method does not consider the slice, the new RAN node B which has received the request may provide incorrect ABS information to the new RAN node A. In addition, due to this reason, a lot of information provided by the existing interference coordination method may be useless. Therefore, the interference coordination method considering slice may be necessary.

In addition, according to the conventional technique, mobility robustness optimization (MRO) is performed without considering a service provided to a UE. That is, irrespective of a service provided by a BS, the BS detects a connection failure such as a radio link failure (RLF) or a handover failure, and adjusts a handover related parameter on the basis of a problem reported by a neighboring BS. However, since a new RAN node provides a service to the UE on the basis of a slice, the use of the existing MRO method may cause various problems. For example, upon detecting the connection failure, a handover related parameter for a real time service needs to be adjusted as fast and correct as possible, whereas a handover related parameter for a non-real time service needs to be reconfigured slowly and step by step. For the MRO, if this service is not considered, a subsequent UE which performs a handover may experience the RLF, and may not be able to satisfy a service requirement. Accordingly, there is a need to perform the MRO considering the slice.

In addition, according to the conventional technique, load balancing between cells or load balancing between BSs supports one reporting scheme. That is, based on one principle, the BS may trigger a handover for all UEs or may adjust a mobility setting parameter. On the other hand, a UE type is not considered. This may cause various problems. For example, the mobility setting parameter is not necessarily to be changed according to the number of UEs of a specific slice which is still under control, whereas it may be necessarily to be changed according to another slice. The current method cannot support a use case described above. On the other hand, when a source node determines to trigger a handover for a specific UE type, the same problem may occur.

Hereinafter, a method of performing interference coordination, MRO, or load balancing on a slice basis and a device supporting the method will be described according to an embodiment of the present invention. In the present specification, a BS may be an eNB (enhanced eNB) or a gNB. The enhanced eNB may be a BS which can be connected to an NGC. Each BS may know a slice supported by a neighboring BS and a resource allocated to each slice.

Figure 7:
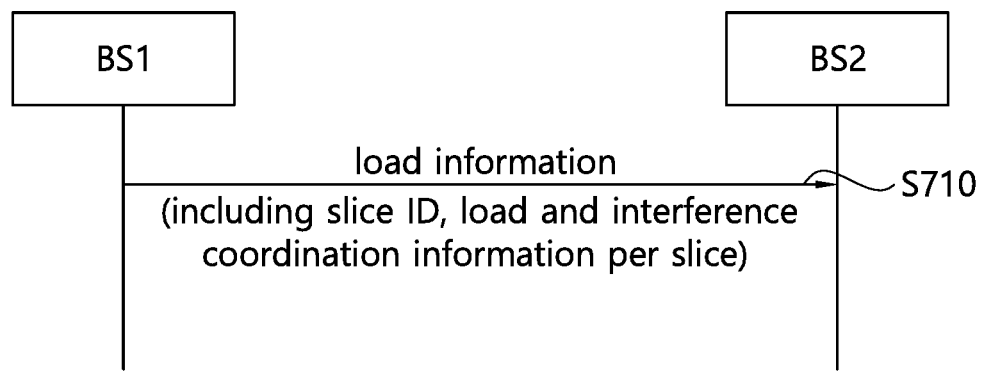
FIG. 7 shows a procedure of providing interference coordination information per slice according to an embodiment of the present invention.

FIG. 7 shows a procedure of providing interference coordination information per slice according to an embodiment of the present invention.

Referring to FIG. 7, in step S710, a BS1 may transmit to a BS2 a load information message or a new message. The load information message or the new message may include a slice ID and a load and interference coordination information per slice. The load and interference coordination information per slice may include at least any one of UL interference overload indication per slice, UL high interference information per slice, relative narrowband Tx power per slice, ABS information per slice, and CoMP information per slice.

Upon receiving the message from the BS1 by the BS2, the BS2 may take information included in the message into consideration when setting a scheduling policy of the BS2 per slice. Alternatively, the BS2 may take information included in the message into consideration when scheduling UEs per slice. Alternatively, the BS2 may take information included in the message into consideration when performing radio resource management (RRM) per slice.

Figure 8:
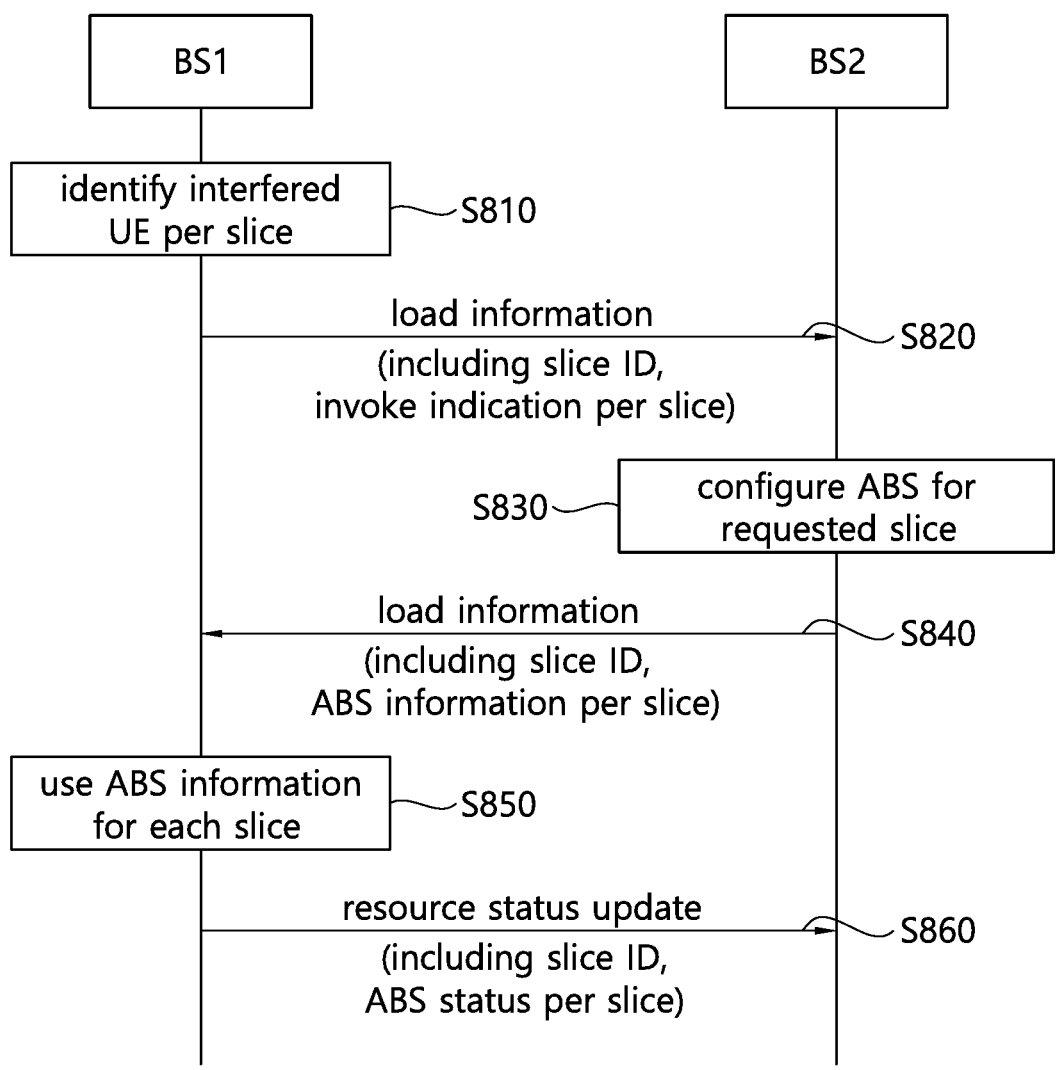
FIG. 8 shows a procedure of providing ABS related information per slice according to an embodiment of the present invention.

FIG. 8 shows a procedure of providing ABS related information per slice according to an embodiment of the present invention.

Referring to FIG. 8, in step S810, a BS1 may identify interfered UEs per slice. The slice may be a slice being served by the BS1.

In step S820, the BS1 may transmit to a BS2 a load information message or a new message. The load information message or the new message may include a slice ID and invoke indication per slice to request for an ABS configuration per slice. For example, when the BS1 requests for an ABC configuration for a plurality of slices, the BS1 may transmit to the BS2 the load information message or new message including the slice ID and invoke indication for each slice.

In step S830, upon receiving the message from the BS1 by the BS2, the BS2 may configure an ABS for each slice requested by the BS1.

In step S840, the BS2 may transmit to the BS1 a load information message or a new message. The load information message or the new message may include a slice ID and ABS information (e.g., ABS pattern) per requested slice. For example, when the BS1 requests for an ABS configuration for a plurality of slices, the BS2 may transmit to the BS1 the new message or load information message including the slice ID and ABS information for each requested slice.

In step S850, upon receiving the message from the BS2 by the BS1, the BS1 may take the received ABS information for each slice into consideration when scheduling UEs per slice.

In step S860, the BS1 may transmit to the BS2 a resource status update message or a new message. The resource status update message or the new message may include a slice ID and ABS status per slice corresponding to the slice received in step S840. For example, the ABS status may be usable ABS pattern information. The slice ID and the ABS status may be used to assist the BS2 in determining whether the number of configured ABSs per slice needs to be changed.

Figure 9:
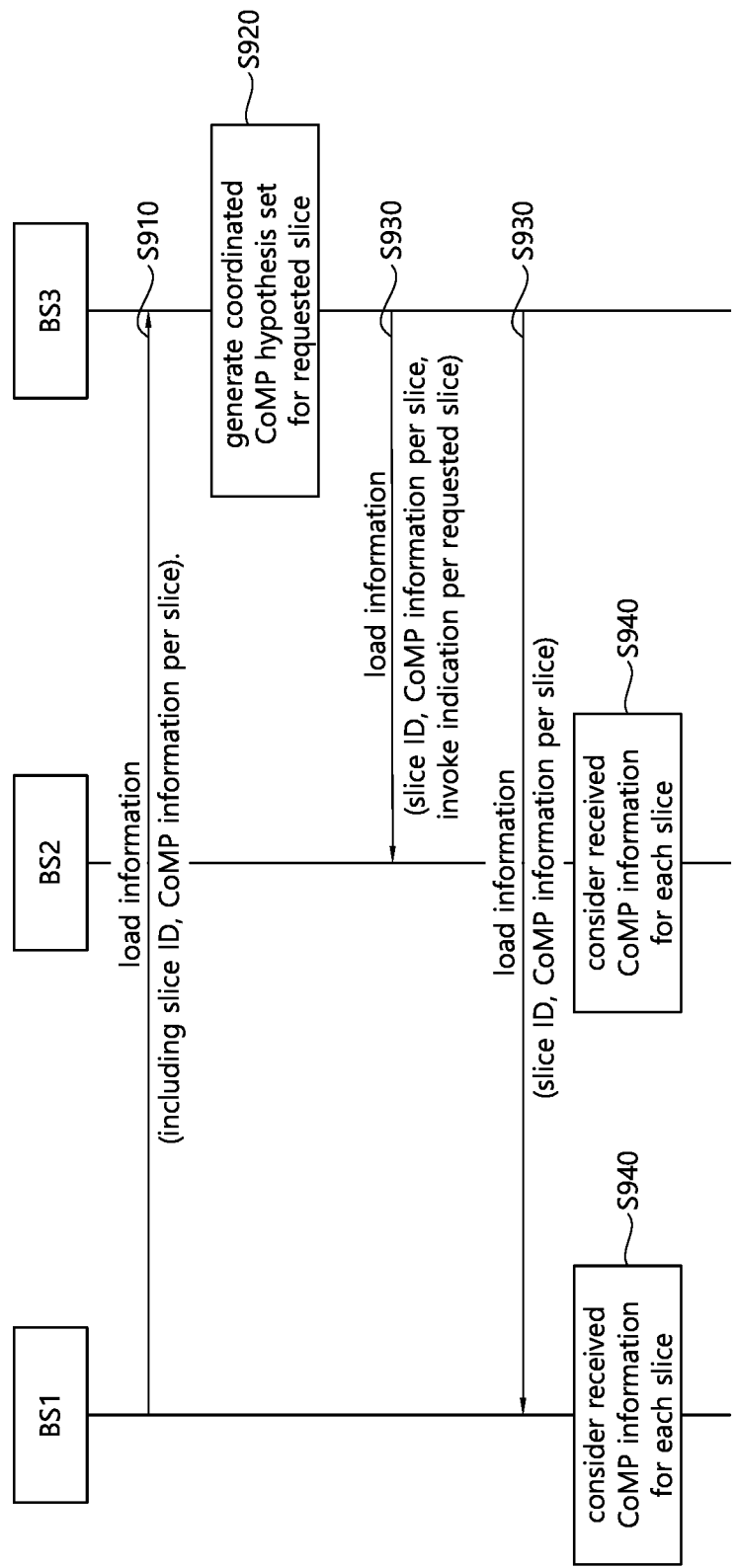
FIG. 9 shows a procedure of providing CoMP information per slice according to an embodiment of the present invention.

FIG. 9 shows a procedure of providing CoMP information per slice according to an embodiment of the present invention.

Referring to FIG. 9, in step S910, a BS1 may transmit to a BS3 a load information message or a new message. The BS3 may be a coordinator for a CoMP operation. The load information message or the new message may include a slice ID and CoMP information per slice which requests for the CoMP operation. For example, the CoMP information may be a benefit metric and a CoMP hypothesis set. For example, when the BS1 requests for the CoMP operation for a plurality of slices, the BS1 may transmit to the BS3 the load information message or new message including the slice ID and CoMP information for each slice.

In step S920, upon receiving the message from the BS1 by the BS3, the BS3 may configure a coordinated CoMP hypothesis set for each slice requested by the BS1.

In step S930, the BS3 may transmit to the BS1 and the BS2 a load information message or a new message. The load information message or the new message may include a slice ID and CoMP information per requested slice. For example, the CoMP information may be a CoMP hypothesis set or a CoMP information start time. In addition, the load information message or new message transmitted to the BS2 may include an invoke indication per slice to request for CoMP information for each slice requested by the BS1.

In step S940, upon receiving the message from the BS3, the BS1 and the BS2 may take the received CoMP information for each slice into consideration for RRM per slice. If the received message includes an invoke indication for a certain slice, a BS which receives the invoke indication may transmit to the BS3 a load information message or new message including a slice ID and CoMP information for the certain slice.

Figure 10:
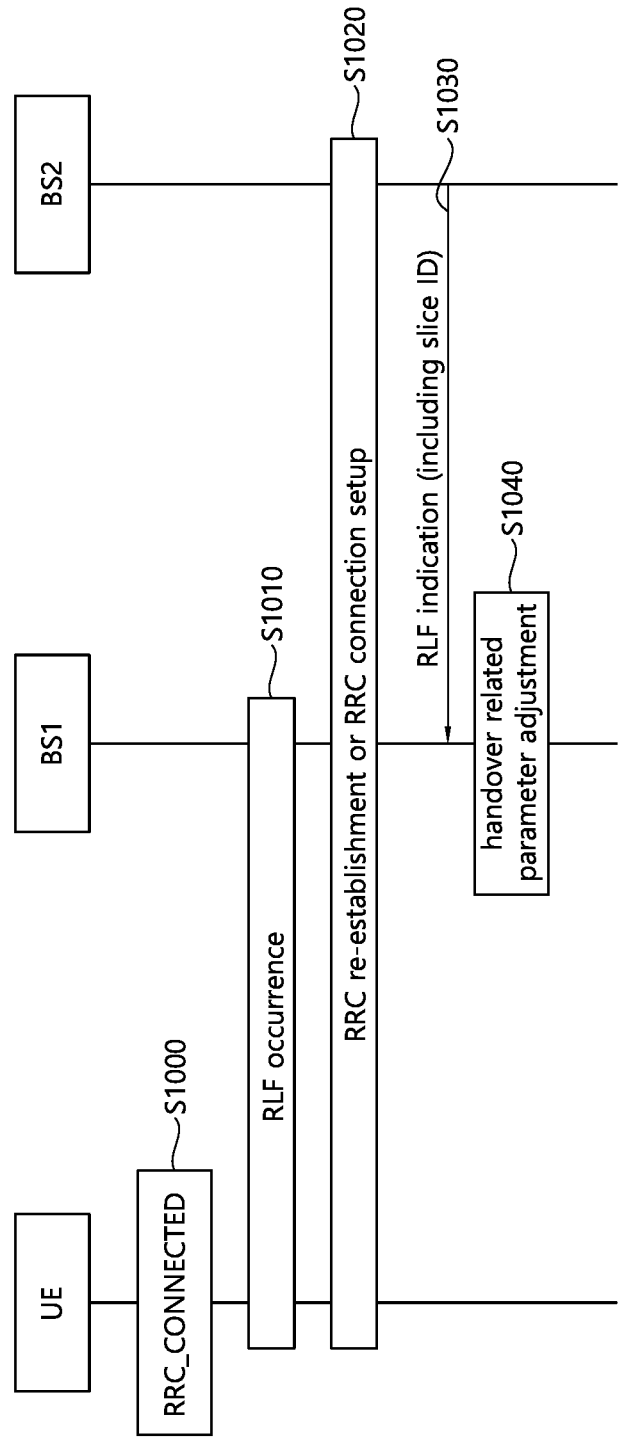
FIG. 10 shows a procedure of performing MRO per slice according to an embodiment of the present invention.

FIG. 10 shows a procedure of performing MRO per slice according to an embodiment of the present invention.

Referring to FIG. 10, in step S1000, a UE may be in an RRC_CONNECTED state.

In step S1010, an RLF may occur. For example, the RLF may occur while the UE has moved to a BS2 and has stayed for a long period of time in the BS2 without triggering a handover. The handover may be an Xn-based handover.

In step S1020, the UE may attempt to re-establish or set up a radio link connection in the BS2.

In step S1030, after the re-establishment or setup of the RRC connection, the BS2 may transmit to the BS1 an RLF indication message or a new message. The RLF indication message or the new message may include a slice ID and RLF related information. The RLF indication message or the new message may be transmitted to transfer information regarding RRC re-establishment attempts or received RLF reports. The RLF related information may include at least any one of a failure cell ID, a reestablishment cell ID, a C-RNTI, a shortMAC-U, a UE RLF report container, and a reestablishment cause.

If the UE receives a plurality of services, the RLF indication message or the new message may include a list of slice ID and RLF related information irrespective of the slice ID. Alternatively, if the UE receives the plurality of services, the RLF indication message or the new message may include a list of slice ID and RLF related information for each slice. In the latter case, some of RLF related information (e.g. failure cell ID, reestablishment cell ID, C-RNTI) may not be related to the slice ID.

In step S1040, upon receiving the message from the BS2 by the BS1, the BS1 may detect an RLF case and may adjust a handover related parameter of the BS1 so that the RLF for the UE which moves to the BS2 does not occur afterwards.

Figure 11:
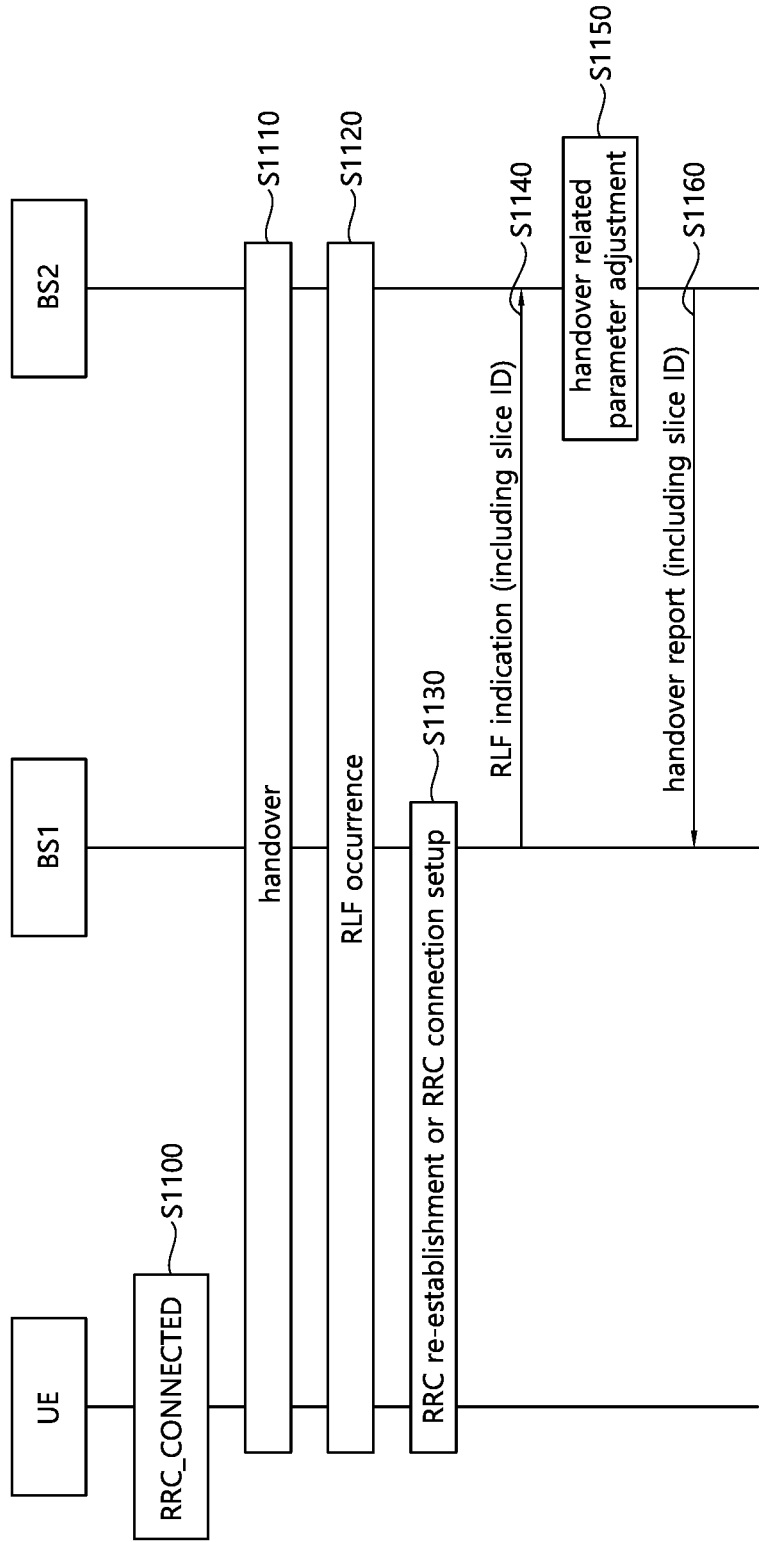
FIG. 11 shows a procedure of performing MRO per slice according to an embodiment of the present invention.

FIG. 11 shows a procedure of performing MRO per slice according to an embodiment of the present invention.

Referring to FIG. 11, in step S1100, a UE may be in an RRC_CONNECTED state.

In step S1110, although the UE is located in the coverage of a BS1, a handover may be performed when the UE is located in the vicinity of the coverage of the BS2. The handover may be an Xn-based handover.

In step S1120, an RLF may occur after the handover is complete.

In step S1130, the UE may attempt to re-establish or setup a radio link connection in the BS1.

In step S1140, after the re-establishment or setup of the RRC connection, the BS1 may transmit to the BS2 an RLF indication message or a new message. The RLF indication message or the new message may include a slice ID and RLF related information. The RLF indication message or the new message may be transmitted to transfer information regarding RRC re-establishment attempts or received RLF reports. The RLF related information may include at least any one of a failure cell ID, a reestablishment cell ID, a C-RNTI, a shortMAC-U, a UE RLF report container, and a reestablishment cause.

If the UE receives a plurality of services, the RLF indication message or the new message may include a list of slice ID and RLF related information irrespective of the slice ID. Alternatively, if the UE receives the plurality of services, the RLF indication message or the new message may include a list of slice ID and RLF related information for each slice. In the latter case, some of RLF related information (e.g. failure cell ID, reestablishment cell ID, C-RNTI) may not be related to the slice ID.

In step S1150, upon receiving the message from the BS1 by the BS2, the BS2 may detect an RLF case and may adjust a handover related parameter of the BS2 so that the RLF for the moving UE does not occur afterwards.

In step S1160, the BS2 may transmit to the BS1 the handover report message or the new message. The handover report message or the new message may include a slice ID and mobility related information. The handover report message or the new message may be transmitted to indicate that a mobility related problem is detected. The mobility related information may include at least any one of a type of detected handover problem (e.g., too early handover), an ECGI of source and target cells in the handover, a C-RNTI (C-RNTI allocated for the UE in the source cell), mobility information, and a UE RLF report.

If the UE receives a plurality of services, the handover report message or the new message may include a list of slice ID and mobility related information irrespective of the slice ID. Alternatively, if the UE receives the plurality of services, the handover report message or the new message may include a list of slice ID and mobility related information for each slice. In the latter case, some of the mobility related information (e.g., the type of detected handover problem, the ECGI of source and target cells in the handover, the handover cause, the C-RNTI allocated for the UE in the source cell) may not be related to the slice ID.

Upon receiving the handover report message or the new message from the BS2 by the BS1, the BS1 may detect that the RLF has occurred after a successful handover from the BS1 to the BS2. In addition, the BS1 may detect that the UE has attempted an RRC re-establishment in the BS1.

Figure 12:
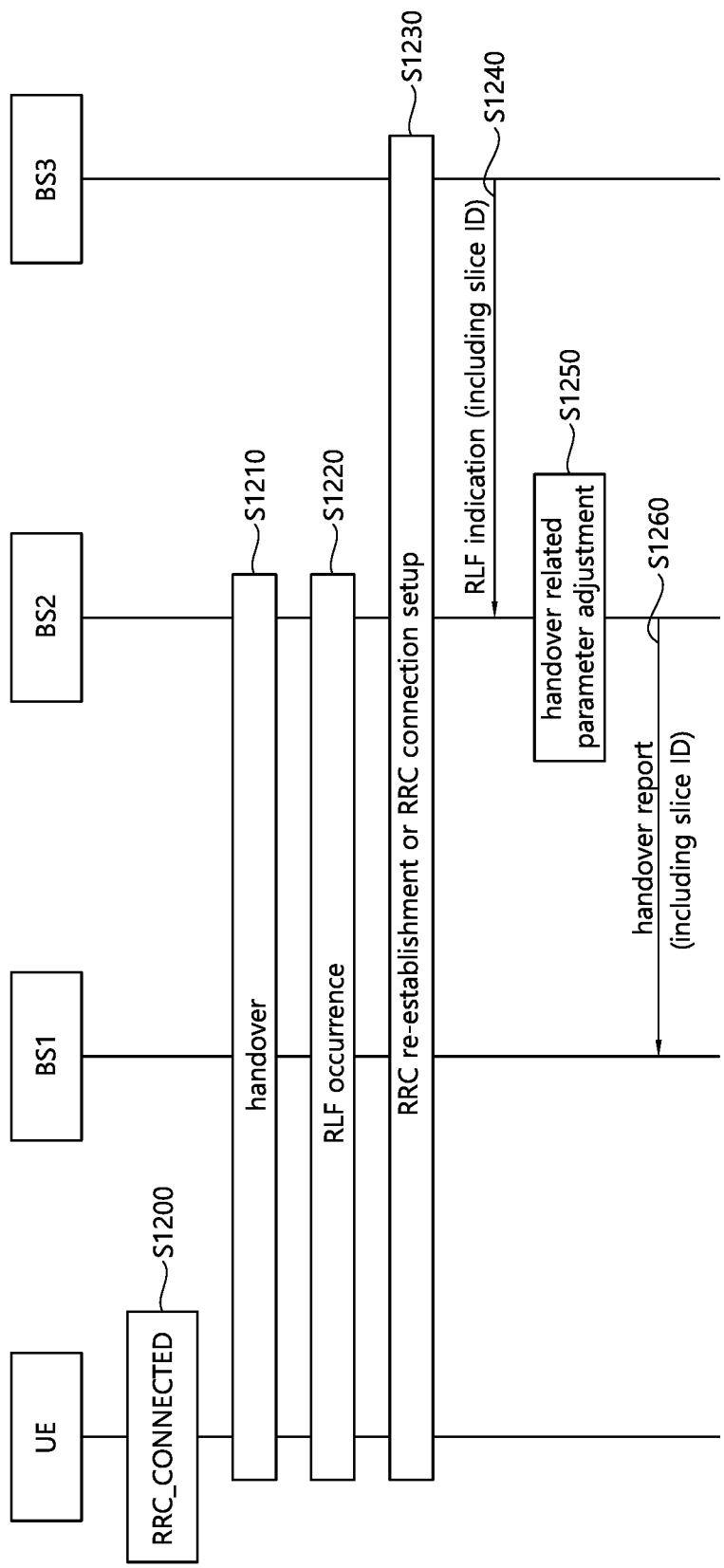
FIG. 12 shows a procedure of performing MRO per slice according to an embodiment of the present invention.

FIG. 12 shows a procedure of performing MRO per slice according to an embodiment of the present invention.

Referring to FIG. 12, in step S1200, a UE may be in an RRC_CONNECTED state.

In step S1210, when the UE moves to a BS3, a handover may be performed between a BS1 and a BS2. This is because the UE moves in the vicinity of coverage of the BS2 although it is located in coverage of the BS3. The handover may be an Xn-based handover.

In step S1220, an RLF may occur after the handover is complete.

In step S1230, the UE may attempt to re-establish or setup a radio link connection in the BS3.

In step S1240, after the re-establishment or setup of the RRC connection, the BS3 may transmit to the BS2 an RLF indication message or a new message. The RLF indication message or the new message may include a slice ID and RLF related information. The RLF indication message or the new message may be transmitted to transfer information regarding RRC re-establishment attempts or received RLF reports. The RLF related information may include at least any one of a failure cell ID, a reestablishment cell ID, a C-RNTI, a shortMAC-U, a UE RLF report container, and a reestablishment cause.

If the UE receives a plurality of services, the RLF indication message or the new message may include a list of slice ID and RLF related information irrespective of the slice ID. Alternatively, if the UE receives the plurality of services, the RLF indication message or the new message may include a list of slice ID and RLF related information for each slice. In the latter case, some of RLF related information (e.g. failure cell ID, reestablishment cell ID, C-RNTI) may not be related to the slice ID.

In step S1250, upon receiving the message from the BS3 by the BS2, the BS2 may detect an RLF case and may adjust a handover related parameter of the BS2 so that the RLF for the UE which moves to the BS3 does not occur afterwards.

In step S1260, the BS2 may transmit to the BS1 the handover report message or the new message. The handover report message or the new message may include a slice ID and mobility related information. The handover report message or the new message may be transmitted to indicate that a mobility related problem is detected. The mobility related information may include at least any one of a type of detected handover problem (e.g., too early handover), an ECGI of source and target cells in the handover, a C-RNTI (C-RNTI allocated for the UE in the source cell), mobility information, and a UE RLF report.

If the UE receives a plurality of services, the handover report message or the new message may include a list of slice ID and mobility related information irrespective of the slice ID. Alternatively, if the UE receives the plurality of services, the handover report message or the new message may include a list of slice ID and mobility related information for each slice. In the latter case, some of the mobility related information (e.g., the type of detected handover problem, the ECGI of source and target cells in the handover, the handover cause, the C-RNTI allocated for the UE in the source cell) may not be related to the slice ID.

Upon receiving the handover report message or the new message from the BS2 by the BS1, the BS1 may detect that the RLF has occurred after a successful handover from the BS1 to the BS2. In addition, the BS1 may detect that the UE has attempted an RRC re-establishment in the BS3.

Figure 13:
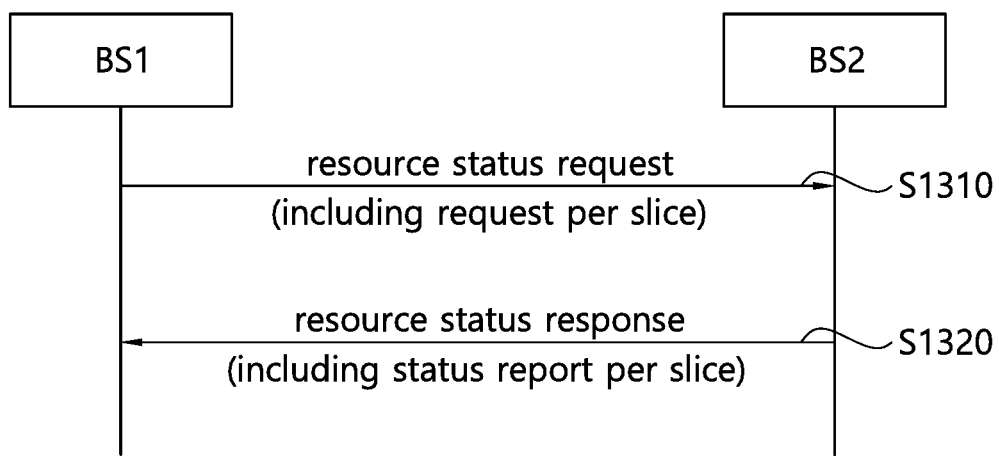
FIG. 13 shows a procedure of requesting for a resource status per slice according to an embodiment of the present invention.

FIG. 13 shows a procedure of requesting for a resource status per slice according to an embodiment of the present invention.

Referring to FIG. 13, in step S1310, a BS1 may transmit to a BS2 a resource status request message. The resource status request message may be transmitted to request for a load measurement result of the BS2. The resource status request message may include an indicator of requesting for a measurement result per slice. This may be decided by a new source RAN node which has a function and intention to manage the load per slice. The new source RAN node may be the BS1.

In step S1320, based on the received indicator, the BS2 may measure the load per slice. In addition, the BS2 may transmit to the BS1 a resource status response message. The resource status response message may include a status report per slice. For example, the resource status response message may include at least any one of a radio resource status per slice, an NG interface TNL load indicator per slice, and a composite available capacity group per slice.

Thereafter, the BS1 may take a load balancing action (e.g., a mobility setting change procedure) per slice by using the received information per slice. Alternatively, the BS1 may trigger a handover for a specific UE type by considering the received report.

Figure 14:
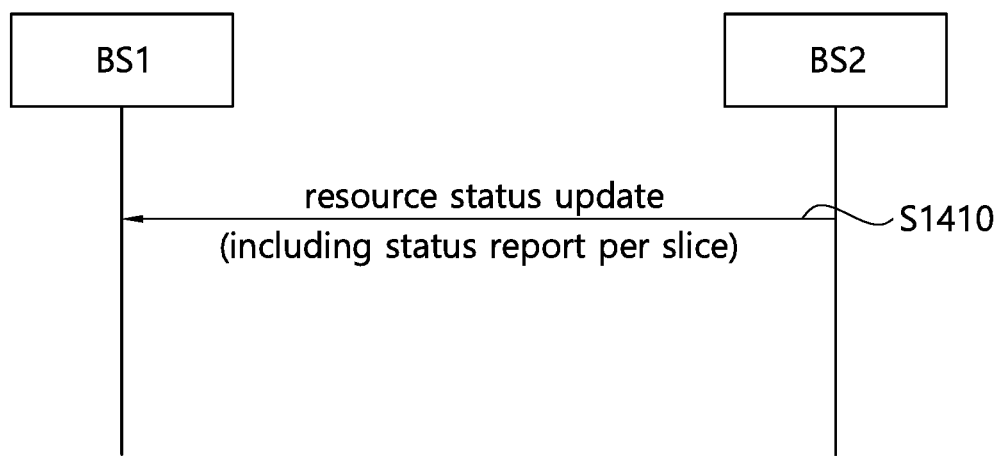
FIG. 14 shows a procedure of updating a resource status per slice according to an embodiment of the present invention.

FIG. 14 shows a procedure of updating a resource status per slice according to an embodiment of the present invention.

Referring to FIG. 14, in step S1410, a BS1 may receive from a BS2 a resource status update message. The resource status update message may include a status report per slice. For example, the resource status update message may include at least any one of a radio resource status per slice, an NG interface TNL load indicator per slice, and a composite available capacity group per slice.

Thereafter, with the received information per slice, the BS1 may take a load balancing action (e.g., mobility setting change procedure) per slice. Alternatively, the BS1 may trigger a handover for a specific UE type considering the received report.

According to an embodiment of the present invention, interference coordination between cells or interference coordination between BSs may be supported on a slice basis. That is, minimum granularity of interference coordination may be a slice unit. Accordingly, based on a resource usage status per slice and a traffic load situation per slice, a new RAN node may manage a radio resource so that inter-cell interference is controlled per slice. Further, UE's experience may be improved, such as interference coordination for a UE in a cell edge or traffic offloading per slice. A BS may easily schedule a radio resource per slice, and may more easily offload a data packet with respect to a specific UE on a slice basis.

According to an embodiment of the present invention, neighboring new RAN nodes may perform MRO differently for each slice which can be served by the nodes. According to a service provided to the UE, a new RAN node may detect a connection failure for UE's mobility, and may adjust a handover related parameter on the basis of a problem reported by the neighboring new RAN node. Accordingly, UE's experience may be further improved such as a smooth and seamless handover.

According to an embodiment of the present invention, load balancing between cells or load balancing between BSs can be supported based on a slice. That is, resource management can be performed per slice. Therefore, a new RAN node can adjust a mobility setting parameter or trigger a handover for UEs with different principles/thresholds. In addition, a UE type may be taken into consideration for resource management between nodes.

Figure 15:
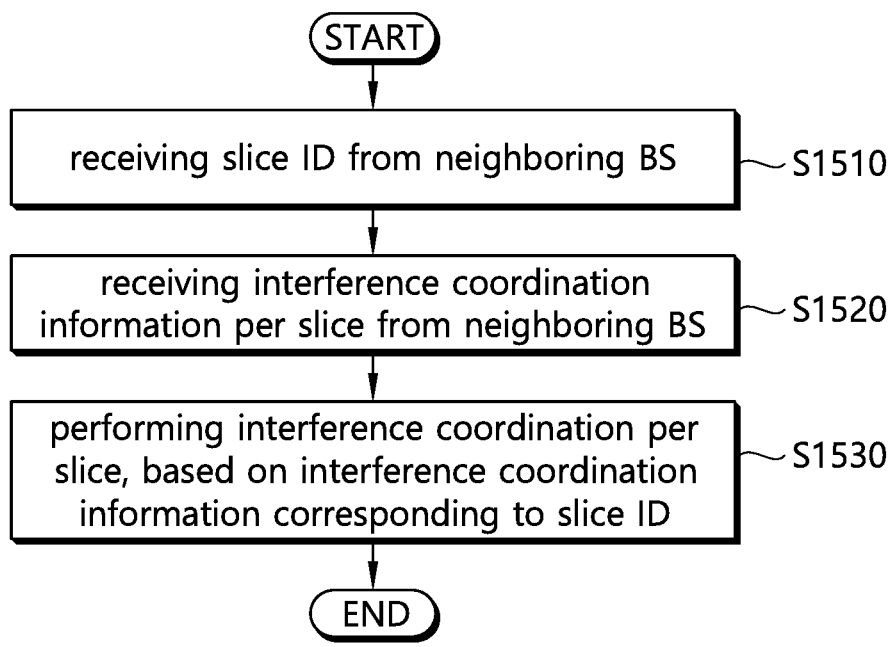
FIG. 15 is a block diagram illustrating a method in which a BS performs interference coordination according to an embodiment of the present invention.

FIG. 15 is a block diagram illustrating a method in which a BS performs interference coordination according to an embodiment of the present invention.

Referring to FIG. 15, in step S1510, the BS may receive a slice ID from a neighboring BS. The slice ID received from the neighboring BS may be an ID of a slice requiring interference coordination.

In step S1520, the BS may receive interference coordination information per slice from the neighboring BS.

The interference coordination information per slice may be almost blank subframe (ABS) information. The ABS information per slice may be an ABS pattern per slice. In addition, the BS may transmit an invoke indication to the neighboring BS, and the ABS information per slice may be received from the neighboring BS in response to the invoke indication.

The interference coordination information per slice may be coordinated multipoint (CoMP) information per slice. The CoMP information may include at least any one of a benefit metric and a CoMP hypothesis set. The BS may be a coordinate for a CoMP operation.

The interference coordination information per slice may be at least any one of UL interference overload indication per slice, UL high interference information per slice, and relative narrowband Tx power per slice.

In step S1530, the BS may perform interference coordination per slice on the basis of the interference coordination information corresponding to the slice ID.

The interference coordination per slice may be UE scheduling per slice. In addition, after performing the interference coordination per slice, the BS may transmit usable ABS pattern information for the slice ID and a slice corresponding to the slice ID to the neighboring BS.

The interference coordination per slice may be determining of a CoMP hypothesis set per slice. In addition, after performing the interference coordination per slice, the BS may transmit the slice ID and the determined CoMP hypothesis set corresponding to the slice ID to the plurality of BSs.

The interference coordination per slice may be at least any one of a radio resource management (RRM) per slice and a scheduling policy setting per slice of the BS.

Figure 16:
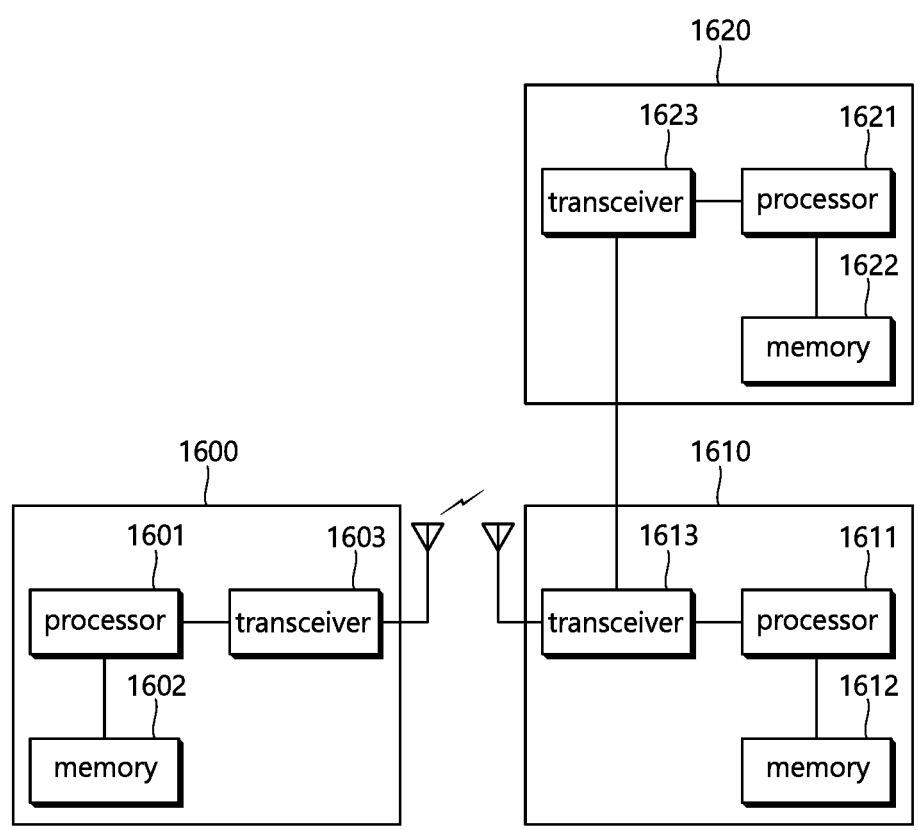
FIG. 16 is a block diagram illustrating a wireless communication system according to the embodiment of the present invention.

FIG. 16 is a block diagram illustrating a wireless communication system according to the embodiment of the present invention.

A UE 1600 includes a processor 1601, a memory 1602 and a transceiver 1603. The memory 1602 is connected to the processor 1601, and stores various information for driving the processor 1601. The transceiver 1603 is connected to the processor 1601, and transmits and/or receives radio signals. The processor 1601 implements proposed functions, processes and/or methods. In the above embodiment, an operation of the user equipment may be implemented by the processor 1601.

A first base station 1610 includes a processor 1611, a memory 1612 and a transceiver 1613. The memory 1612 is connected to the processor 1611, and stores various information for driving the processor 1611. The transceiver 1613 is connected to the processor 1611, and transmits and/or receives radio signals. The processor 1611 implements proposed functions, processes and/or methods. In the above embodiment, an operation of the first base station may be implemented by the processor 1611.

A second base station 1620 includes a processor 1612, a memory 1622 and a transceiver 1623. The memory 1622 is connected to the processor 1621, and stores various information for driving the processor 1621. The transceiver 1623 is connected to the processor 1621, and transmits and/or receives radio signals. The processor 1621 implements proposed functions, processes and/or methods. In the above embodiment, an operation of the second base station may be implemented by the processor 1621.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method in which a base station (BS) performs interference coordination in a wireless communication system, the method comprising:
   transmitting an invoke indication to the neighboring BS;
   receiving a network slice identifier (ID) from a neighboring BS,
   wherein the network slice ID is for identifying any one of a plurality of logical networks, and
   wherein a physical network is sliced into the plurality of logical networks based on at least one service;
   receiving interference coordination information per network slice from the neighboring BS,
   wherein the interference coordination information per network slice includes an almost blank subframe (ABS) pattern per network slice, and
   wherein the ABS pattern per network slice is received from the neighboring BS in response to the invoke indication;
   performing interference coordination per network slice based on the interference coordination information related to the network slice ID; and
   after performing the interference coordination per network slice, transmitting usable ABS pattern information for the network slice ID and a network slice related to the network slice ID to the neighboring BS.

2. The method of claim 1, wherein the interference coordination per network slice includes user equipment (UE) scheduling per network slice.

3. The method of claim 1, wherein the interference coordination information per network slice includes coordinated multipoint (CoMP) information per network slice.

4. The method of claim 3, wherein the CoMP information include at least any one of a benefit metric and a CoMP hypothesis set.

5. The method of claim 3, wherein the BS is a coordinator for a CoMP operation.

6. The method of claim 3, wherein the interference coordination per network slice includes determining of a CoMP hypothesis set per network slice.

7. The method of claim 6, further comprising, after performing the interference coordination per network slice, transmitting the network slice ID and the determined CoMP hypothesis set related to the network slice ID to the plurality of BSs.

8. The method of claim 1, wherein the network slice ID received from the neighboring BS is an ID of a network slice requiring interference coordination.

9. The method of claim 1, wherein the interference coordination information per network slice includes at least any one of uplink (UL) interference overload indication per network slice, UL high interference information per network slice, and relative narrowband transmit (Tx) power per network slice.

10. The method of claim 1, wherein the interference coordination per network slice is at least any one of a radio resource management (RRM) per network slice and a scheduling policy setting per network slice of the BS.

11. A base station (BS) for performing interference coordination in a wireless communication system, the BS comprising:
   a memory; a transceiver; and a processor coupling the memory and the transceiver, wherein the processor is configured to:
   control the transceiver to transmit an invoke indication to the neighboring BS,
   control the transceiver to receive a network slice identifier (ID) from a neighboring BS,
   wherein the network slice ID is for identifying any one of a plurality of logical networks, and
   wherein a physical network is sliced into the plurality of logical networks based on at least one service;
   control the transceiver to receive interference coordination information per network slice from the neighboring BS,
   wherein the interference coordination information per network slice includes an almost blank subframe (ABS) pattern per network slice, and
   wherein the ABS pattern per network slice is received from the neighboring BS in response to the invoke indication;
   perform interference coordination per network slice on based on the interference coordination information related to the network slice ID; and
   after performing the interference coordination per network slice, control the transceiver to transmit usable ABS pattern information for the network slice ID and a network slice related to the network slice ID to the neighboring BS.

* * * * *